(12) United States Patent
Cocciadiferro

(10) Patent No.: US 11,567,476 B2
(45) Date of Patent: Jan. 31, 2023

(54) COMPUTING SYSTEM WITH DISCRIMINATIVE CLASSIFIER FOR DETERMINING SIMILARITY OF A MONITORED GAS DELIVERY PROCESS

(71) Applicant: HORIBA STEC, Co., Ltd., Kyoto (JP)

(72) Inventor: Edward Cocciadiferro, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 396 days.

(21) Appl. No.: 17/007,162

(22) Filed: Aug. 31, 2020

(65) Prior Publication Data

US 2021/0397158 A1    Dec. 23, 2021

Related U.S. Application Data

(60) Provisional application No. 63/042,723, filed on Jun. 23, 2020.

(51) Int. Cl.
*G05B 19/00* (2006.01)
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/45031* (2013.01)

(58) Field of Classification Search
None
See application file for complete search history.

(56) References Cited

U.S. PATENT DOCUMENTS

| | | | | |
|---|---|---|---|---|
| 2011/0247432 A1* | 10/2011 | Kelnhofer | ............... | B64D 13/00 |
| | | | | 73/861.351 |
| 2012/0154159 A1* | 6/2012 | Huang | ................... | F23K 5/007 |
| | | | | 340/606 |
| 2022/0082409 A1* | 3/2022 | Ukil | ....................... | G16Y 10/35 |

* cited by examiner

*Primary Examiner* — Paul B Yanchus, III
(74) *Attorney, Agent, or Firm* — Alleman Hall Creasman & Tuttle LLP

(57) ABSTRACT

A gas delivery apparatus is provided, comprising a system controller configured to collect valve position information and sensor information from at least a plurality of the sensors and valves, store the valve position information and sensor information into the monitored gas delivery process data, and execute the discriminative classifier including a first artificial intelligence (AI) model configured to extract features in a first input image of the monitored gas delivery process; a second AI model configured to extract features in a second input image of a golden gas delivery process; and a contrastive loss function configured to calculate a similarity between the first input image and the second input image based on outputs of the first AI model and the second AI model, and output a repeatability confidence value based on a similarity index between the first input image and the second input image.

20 Claims, 13 Drawing Sheets

40 ↘

EXAMPLE MONITORED PROCESS

| TIME | P SENSOR READING | T SENSOR READING | Q SENSOR READING |
|---|---|---|---|
| 0 | 0.904309 | 0.562382 | 0.80824167 |
| 0.1 | 0.904311 | 0.562383 | 0.80824488 |
| 0.2 | 0.904313 | 0.562384 | 0.80824807 |
| 0.3 | 0.904315 | 0.562385 | 0.80825122 |
| 0.4 | 0.904317 | 0.562386 | 0.80825434 |
| 0.5 | 0.904319 | 0.562387 | 0.80825742 |
| 0.6 | 0.904321 | 0.562388 | 0.80826048 |
| 0.7 | 0.904322 | 0.562389 | 0.80826351 |
| 0.8 | 0.904324 | 0.562391 | 0.80826651 |
| 0.9 | 0.904326 | 0.562392 | 0.80826947 |
| 1.0 | 0.904328 | 0.562393 | 0.80827241 |

42 ↘

EXAMPLE GOLDEN PROCESS

| TIME | P SENSOR READING | T SENSOR READING | Q SENSOR READING |
|---|---|---|---|
| 0 | 0.899810 | 0.562382 | 0.800565 |
| 0.1 | 0.899812 | 0.562383 | 0.800569 |
| 0.2 | 0.899814 | 0.562384 | 0.800572 |
| 0.3 | 0.899816 | 0.562385 | 0.800575 |
| 0.4 | 0.899818 | 0.562386 | 0.800578 |
| 0.5 | 0.899820 | 0.562387 | 0.800581 |
| 0.6 | 0.899821 | 0.562388 | 0.800584 |
| 0.7 | 0.899823 | 0.562389 | 0.800587 |
| 0.8 | 0.899825 | 0.562391 | 0.800590 |
| 0.9 | 0.899827 | 0.562392 | 0.800593 |
| 1.0 | 0.899828 | 0.562393 | 0.800596 |

SIMILARITY INDEX RESULTS AT BEGINNING OF PROCESS

| | | | | |
|---|---|---|---|---|
| Time segment 1 | 1 | 1 | 1 | 1 |
| Time segment 2 | 1 | 1 | 1 | 1 |
| Time segment 3 | 1 | 1 | 1 | 1 |
| Time segment 4 | 1 | 1 | 1 | 1 |
| Time segment 5 | 1 | 1 | 1 | 1 |
| Time segment 6 | 1 | 1 | 1 | 1 |
| Time segment 7 | 1 | 1 | 1 | 1 |
| Time segment 8 | 1 | 1 | 1 | 1 |
| Time segment 9 | 1 | 1 | 1 | 1 |
| Time segment 10 | 1 | 1 | 1 | 1 |
| Time segment 11 | 1 | 1 | 1 | 1 |

SIMILARITY INDEX RESULTS AT END OF PROCESS

| | | | | |
|---|---|---|---|---|
| Time segment 81 | 0.998095 | 0.998095 | 0.998094 | 0.998094 |
| Time segment 82 | 0.998094 | 0.998094 | 0.998094 | 0.998094 |
| Time segment 83 | 0.998094 | 0.998094 | 0.998094 | 0.998034 |
| Time segment 84 | 0.998033 | 0.998033 | 0.998033 | 0.998033 |
| Time segment 85 | 0.998033 | 0.998033 | 0.998033 | 0.998033 |
| Time segment 86 | 0.998032 | 0.998032 | 0.998031 | 0.998030 |
| Time segment 87 | 0.998029 | 0.998029 | 0.998029 | 0.998029 |
| Time segment 88 | 0.998028 | 0.998028 | 0.998028 | 0.998027 |
| Time segment 89 | 0.998027 | 0.998027 | 0.998026 | 0.998026 |
| Time segment 90 | 0.998026 | 0.998025 | 0.998025 | 0.998025 |
| Time segment 91 | 0.998024 | 0.998024 | 0.998023 | 0.998023 |

FIG. 6

COMPUTING SYSTEM WITH DISCRIMINATIVE CLASSIFIER FOR DETERMINING SIMILARITY OF A MONITORED GAS DELIVERY PROCESS

CROSS REFERENCE TO RELATED APPLICATIONS

This application claims priority to U.S. Provisional Patent Application Ser. No. 63/042,723, filed Jun. 23, 2020, the entirety of which is hereby incorporated herein by reference for all purposes.

BACKGROUND

In the apparatuses of gas delivery systems that are used to supply various kinds of gases in semiconductor manufacturing, multiple gas supply channels may flow different gases to be mixed and supplied for various manufacturing processes. A mass flow controller is provided for each gas supply channel to adjust the flow rate of the gas.

In some gas delivery systems, the mass flow controllers may all be connected via a network to a central control unit which remotely sends commands to the mass flow controllers and requests process data via the network. Each mass flow controller maintains its own control loop with the central control unit, synchronized to commands sent via the network from the central control unit. A predefined gas delivery process, including the sequenced delivery of one or more gasses at various flow rates and pressures to downstream equipment such as a semiconductor process chamber, is fulfilled by sending sequential flow commands and settings via a local computer network to the mass flow controllers. The control unit receives feedback from each mass flow controller, which it uses for feedback control of each mass flow controller and to log the actual gas delivery process for quality assurance purposes. However, for high precision control, as sensor resolution increases and data flows become larger, real-time data acquisition of data from sensors and processors on the individual mass flow controllers by the control unit may be difficult to achieve, especially when local computer network capacity and bandwidth are constrained. Further, even if such data is acquired by the control unit, monitoring a target process (i.e., a current process occurring in real time or a process that has been performed in the past and is later analyzed) of the gas delivery system for subtle deviations from an idealized process definition is difficult.

SUMMARY

According to one aspect of the present disclosure, a gas delivery apparatus is provided, comprising a plurality of valves and sensors, a processor operatively coupled to the plurality of valves and sensors, and non-volatile memory operatively coupled to the processor and storing monitored gas delivery process data, golden gas delivery process data, and a discriminative classifier. The non-volatile memory stores executable instructions that, in response to execution by the processor, cause the processor to: receive the monitored gas delivery process data comprising sensor information and/or valve position information of the monitored gas delivery process; receive the golden gas delivery process data comprising sensor information and/or valve position information of the golden gas delivery process; and execute the discriminative classifier including at least one artificial intelligence model, the discriminative classifier being configured to: extract features of the monitored gas delivery process data; extract features of the golden gas delivery process data; calculate a similarity value for the monitored gas delivery process based on the extracted features in the monitored gas delivery process data and the extracted features in the golden gas delivery process data; and output the similarity value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example of monitored gas delivery process data and golden gas delivery process data according to one example of the gas delivery system of FIG. 1.

FIG. 6 shows an example of similarity indices for a monitored gas delivery process of a gas delivery system according to one example of the gas delivery system of FIG. 1.

DETAILED DESCRIPTION

Figure 1:
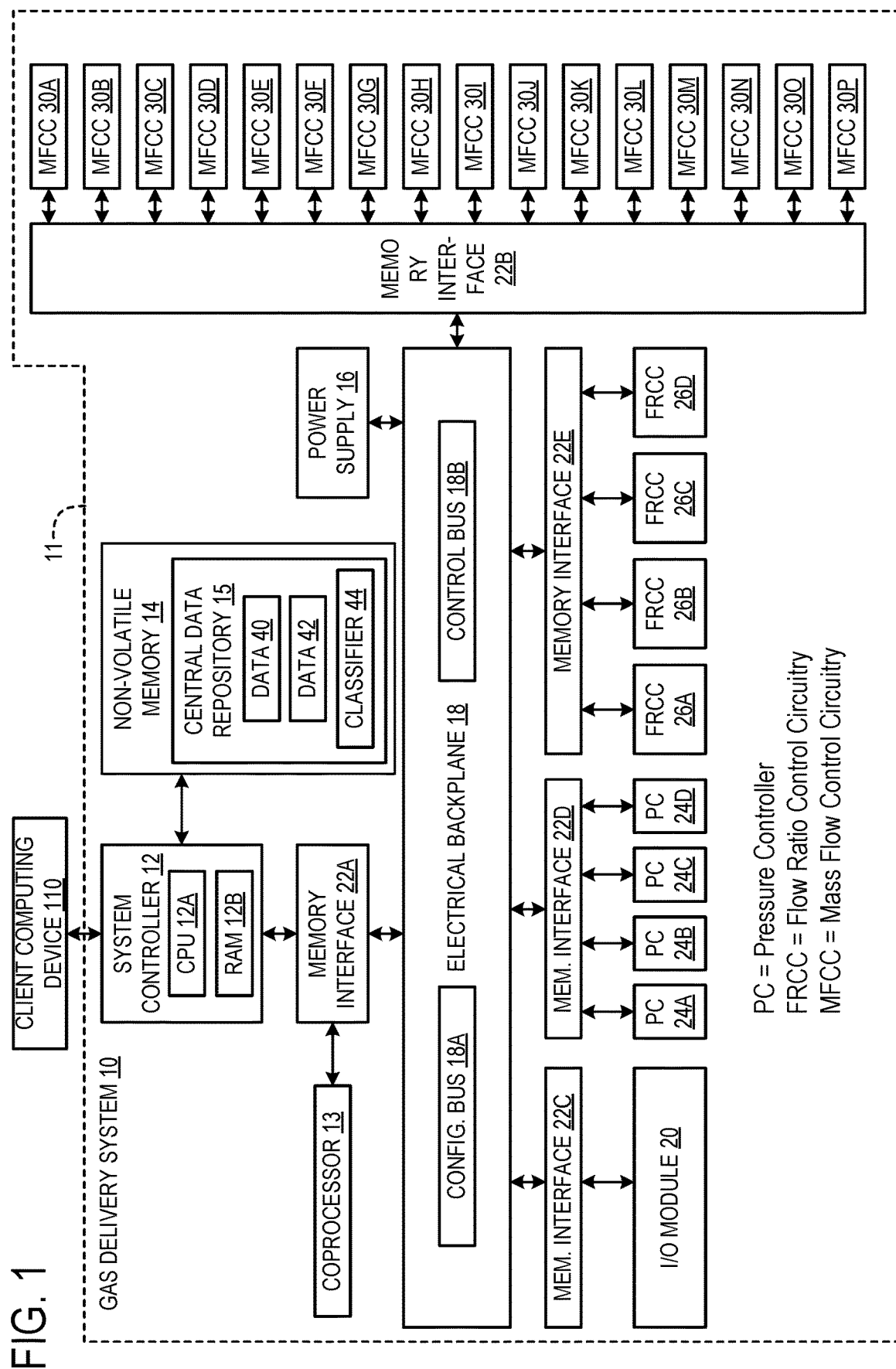
FIG. 1 shows a schematic view of a gas delivery system according to one example of the present disclosure.

In view of the above issues, referring to FIG. 1, a gas delivery system 10 is provided comprising a unified high-speed electrical backplane 18 that is operatively coupled to a system controller 12 via a first memory interface 22A, operatively coupled to a plurality of mass flow control circuitry 30A-P via a second memory interface 22B, operatively coupled to an input/output module 20 via a third memory interface 22C, operatively coupled to a plurality of pressure controllers 24A-D via a fourth memory interface 22D, and operatively coupled to a plurality of flow ratio control circuitry 26A-D via a fifth memory interface 22E. It will be appreciated that the centralization of the gas delivery system 10 is achieved by coupling all the sensors and control circuitry of the gas delivery system 10 to one system controller 12 and one central data repository 15. Typically, the electrical backplane 18 includes a printed circuit board and the operative coupling between the electrical backplane and these system elements is accomplished by an electrical connection between these elements via an electrical connector. The mass flow controllers 30A-30P each include respective mass flow control circuitry, such as a printed circuit board, each of which is directly mounted to corresponding electrical connector in the printed circuit board of the electrical backplane 18. The gas delivery system 10 may be configured as a gas delivery apparatus which may be enclosed within a housing 11. The electrical backplane 18 is typically configured for high-speed communications between the various components electrically connected thereto. Further, a client computing device 110 may be operatively coupled to the gas delivery system 10 via the system controller 12 to exchange data communications with the system controller 12. These data communications may include instructions or commands, flow diagnostics information, and flow monitoring information of the gas delivery system 10, for example.

The system controller 12 comprises a processor 12A and volatile memory 12B. In some implementations, the system controller 12 may be configured as a System on Module (SOM). The processor 12A may comprise a multi-core processor, for example. The system controller 12 may also incorporate field-programmable gate array (FPGA) or application specific integrated circuit (ASIC) circuitry, for example. The system controller 12 is operatively coupled to a non-volatile memory 14 which stores a central data repository 15, which in turn stores monitored gas delivery process data 40, golden gas delivery process data 42, and a discriminative classifier 44. The mass flow control circuitry 30A-P, flow ratio control circuitry 26A-D, and pressure controllers 24A-D may each comprise at least a processor and at least a memory independent of the system controller 12 and the non-volatile memory 14. The I/O module 20 and the controllers 24A-D, 26A-D, and 30A-P, may alternatively comprise FPGA circuitry without additional processors.

To reduce flow path lengths and cable lengths, the circuit boards of the system controller 12, the mass flow control circuitry 30A-P, flow ratio control circuitry 26A-D, and pressure controllers 24A-D are both physically and electrically mounted on the printed circuit board of the electrical backplane 18 through corresponding electrical connectors. Accordingly, all of the controllers are centralized within the housing 11 of the gas delivery system 10 to facilitate data collection in a single location. This has the advantage of reducing latency and bandwidth requirements for transmitting data from these controllers to a remote location for remote processing and storage.

The electrical backplane 18 may be further operatively coupled to a power supply 16 which is configured to supply power to all the modules and controllers that are physically mounted on the electrical backplane 18, including the system controller 12, input/output module 20, the pressure controllers 24A-D, the flow ratio control circuitry 26A-D, and mass flow control circuitry 30A-P. Accordingly, the length of power cables required in the gas delivery system 10 is greatly reduced. For example, the power supply 16 may comprise a single power supply 24 VDC, 150V shared among all modules in the system.

The electrical backplane 18 forms the backbone of the entire gas delivery system 10. Since data including all communications, control signals, and power supply are embedded on the electrical backplane 18, this allows the system controller 12 real-time access to every sensor and actuator within the gas flow paths. In addition, since the system controller 12 is operatively coupled to the non-volatile memory 14, which is a large high-speed data storage device storing the central data repository 15, it is possible to store large amounts of sensor and actuator data in real time in the monitored gas delivery process data 40 for post-process analysis and long-term storage.

The electrical backplane 18 may include a main printed circuit board (PCB) with high-speed Low Voltage Differential Signaling (LVDS) interface elements for serial communications and control lines. However, it will be appreciated that the PCB is not particularly limited to LVDS elements, and other standards and interface elements may alternatively be implemented in the PCB to achieve high-speed data rates on the electrical backplane 18.

The electrical backplane 18 may contain two independent serial communications systems, one for configuration (configuration bus 18A) and the other for control (control bus 18B). Both may operate together, completely independent, and at the same time. During system power up, and module and system configuration, the control bus 18B may be in standby mode. Once configuration and systems checks are completed, the control bus 18B may transition to operational mode. Appropriate configuration data, module identification data, calibration data, etc. are transferred to each individual module 20, 24A-D, 26A-D, 30A-P via the configuration bus 18A. In addition, during operation, historical data containing the operating logs for all modules connected to the electrical backplane 18 is transferred via the configuration bus 18A. It will be appreciated that the configuration bus 18A operates independently of the control bus 18B of the electrical backplane 18 and of the memory interface 22A.

In the gas delivery system 10, the system controller 12 may be designated as the controller module 12, while the mass flow control circuitry 30A-P, flow ratio control circuitry 26A-D, pressure controllers 24A-D, and input/output module 20 are designated as the controlled modules. As a fully asynchronous system, the controller module 12, the controlled modules 20, 24A-D, 26A-D, 30A-P and the electrical backplane 18 all operate independently and asynchronously, with no wait states or forced interrupts on local processors. The electrical backplane 18 functions as a full duplex serial bus that handles all communications between the controller module 12 and all controlled modules 20, 24A-D, 26A-D, 30A-P, simultaneously transferring read and write data on each cycle. A coprocessor 13, operatively coupled to the first memory interface 22A, arbitrates or coordinates the exchange of data between the system controller 12 and the controlled modules 20, 24A-D, 26A-D, 30A-P. In alternative embodiments, the coprocessor 13 may be incorporated into the first memory interface 22A.

Figure 2:
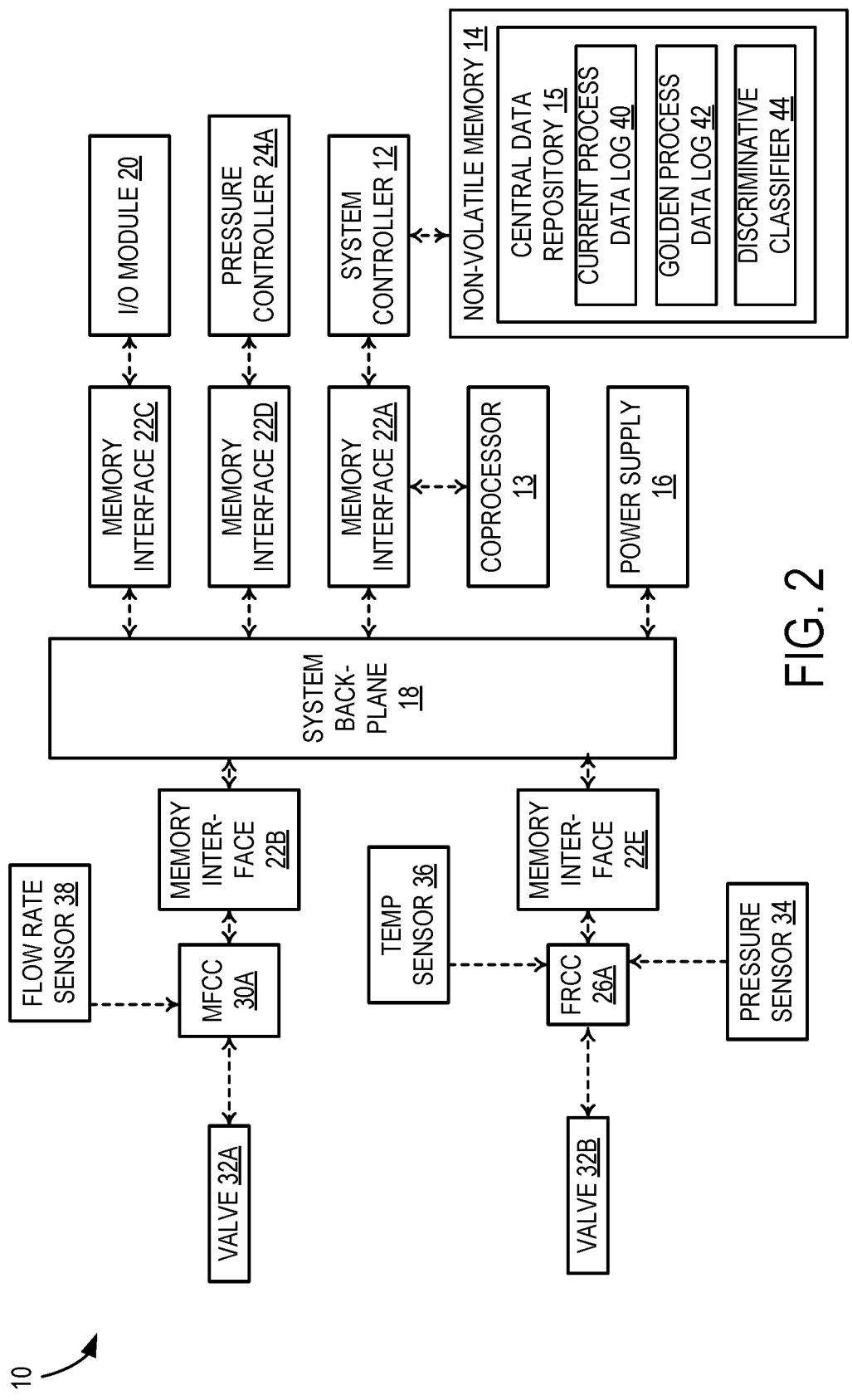
FIG. 2 shows a schematic view of the flows of data and control signals with respect to flow control circuitry according to one example of the gas delivery system of FIG. 1.

FIG. 2 is an exemplary schematic diagram depicting the flows of data and control signals with respect to the first mass flow control circuitry 30A and the first flow ratio control circuitry 26A. For the sake of brevity, the flows of data and control signals with respect to the other controlled modules are not depicted in this schematic diagram.

Referring to FIG. 2, an example of the asynchronous flow of data signals from the flow rate sensor 38 will be described. The flow rate sensor 38 senses a flow rate in the flow path corresponding to the first mass flow control circuitry 30A, and sends a flow rate signal to the first mass flow control circuitry 30A. The first mass flow control circuitry 30A then embeds an address corresponding to the first mass flow control circuitry 30A and the flow rate sensor 38 into a data stream, and sends the data stream containing the embedded address and the flow rate signal to the second memory interface 22B. The second memory interface 22B directs the data stream to the electrical backplane 18, and the electrical backplane 18 sends the data stream to the first memory interface 22A. The coprocessor 13 deserializes the data stream and stores the data stream into a read data register of the first memory interface 22A corresponding to the first mass flow control circuitry 30A. This data stream transmission from the first mass flow control circuitry 30A to the first memory interface 22A may be triggered by a request by the coprocessor 13. The system controller 12 then accesses the read data register of the first memory interface 22A corresponding to the first mass flow control circuitry 30A, and the system controller 12 recognizes the flow rate signals as originating from flow rate sensor 38 corresponding to the first mass flow control circuitry 30A. This data is then stored in the monitored gas delivery process data 40 in the central data repository 15 of the non-volatile memory 14, so that the monitored gas delivery process data 40 will be available for later analysis via a discriminative classifier 44. It will be appreciated that the temperature signals from the temperature sensor 36 and pressure signals from pressure sensor 34 of the first flow ratio control circuitry 26A are similarly handled by the flow ratio control circuitry 26A, the fifth memory interface 22E, electrical backplane 18, the first memory interface 22A, and the system controller 12 to store the temperature signals of the temperature sensor 36 and pressure signals from the pressure sensor 34 into the monitored gas delivery process data 40. Accordingly, the system controller 12 may collect valve position information and sensor information from at least a plurality of the sensors and valves that are operatively coupled to the plurality of mass flow control circuitry 30A-P and flow ratio control circuitry 26A-D, and store the valve position information and sensor information into the monitored gas delivery process data 40 stored in the non-volatile memory 14.

The system controller 12 is not particularly limited to the collection and storage of information, and the system controller 12 is also configured to perform calculations based on the stored valve position and sensor information. In this example, the system controller 12 is also configured to calculate flow and control values based on the valve position and sensor information from the active mass flow control circuitry and active flow ratio control circuitry. For example, when the system controller 12 acquires pressure information, temperature information, and valve position information of a first flow control valve 32A from the first mass flow control circuitry 30A, the system controller 12 may calculate the flow and determine a new appropriate valve position accordingly, then store the new valve position into the first memory interface 22A. The coprocessor 13 may send the new valve position back to the first mass flow control circuitry 30A, which then adjusts the first flow control valve 32A to the new valve position. In other words, the system controller 12 may handle data and control calculations for the gas delivery system 10.

As depicted in FIG. 2, in this example, the first mass flow control circuitry 30A is operatively coupled to the valve 32A. The first mass flow control circuitry 30A may send control signals to valve 32A to control an opening position of valve 32A. In turn, valve 32A may send data signals to the first mass flow control circuitry 30A indicating an opening position of valve 32A. Likewise, the first flow ratio control circuitry 26A is operatively coupled to valve 32B. The first flow ratio control circuitry 26A may send control signals to valve 32B to control an opening position of valve 32B. In turn, valve 32B may send data signals to the first flow ratio control circuitry 26A indicating an opening position of valve 32B. When configured as a shutoff valve, the opening position may be an opening state that is either on or off. When configured as a linear valve, the opening position may be a linear opening position out of a plurality of possible opening positions.

For example, when the system controller 12 closes the shutoff valve 32A in an asynchronous process, the system controller 12 sends a data stream embedded with an address of the first upstream shutoff valve 32A and the first mass flow control circuitry 30A. The data stream enters the first memory interface 22A to a write data register corresponding to the first mass flow control circuitry 30A. The coprocessor 13 then serializes the data stream and sends it into the electrical backplane 18, where the data stream is directed to the second memory interface 22B. The second memory interface 22B reads the address embedded within the data stream, and forwards the data stream to the first mass flow control circuitry 30A. The first mass flow control circuitry 30A then sends a control signal to the first upstream shutoff valve 32A and controls an opening of the first upstream shutoff valve 32A in accordance with the instructions from the system controller 12 in the data stream. It will be appreciated that the system controller 12 may control the other valves in the gas delivery system 10 in a like manner that is completely asynchronous.

As explained in further detail below, the gas delivery system 10 trains the discriminative classifier 44 on sensor information from the plurality of sensors and valve position information from the plurality of valves during a manufacturing process. The system controller 12 subsequently executes the discriminative classifier 44 to monitor variance in the performance of the manufacturing process relative to a golden manufacturing process or conduct feedback training on the discriminative classifier 44 based on the sensor information and the valve position information. The system controller 12 calculates a repeatability confidence value, and may send an alarm when the repeatability confidence value crosses a predetermined threshold.

Referring to FIG. 3, an example of monitored gas delivery process data 40 and an example of golden gas delivery process data 42 are illustrated. The monitored gas delivery process data 40 comprises sensor information and/or valve position information of a monitored gas delivery process. In these examples, pressure readings (P sensor readings), temperature readings (T sensor readings), and flow readings (Q sensor readings) are recorded at regular time intervals. In the examples of FIG. 3, the sensor readings are recorded every 0.1 seconds.

The golden gas delivery process data 42 comprises sensor information and/or valve position information of a golden gas delivery process. In other words, the golden gas delivery process data 42 is a record of sensor readings that are designated as the baseline sensor readings against which the sensor readings of the monitored gas delivery process data 40 are compared and contrasted. It will be appreciated that a golden gas delivery process is a model process that is established by an operator typically under closely monitored conditions on a gas delivery system during a pre-production phase, which is to be followed by a larger number of gas delivery systems during mass production. The sensor readings of the golden gas delivery process data 42 may reflect the normal or ideal conditions of the process before components of the process (valves, sensors, mass flow controllers, electronic circuitry) are replaced, modified, or otherwise changed through intentional alterations or unintentional wear and tear, which can cause aspects of the implementation of a golden gas delivery process to vary on different systems. As shown in these examples, each sensor reading is normalized into a value between 0 and 1.

Figure 4:
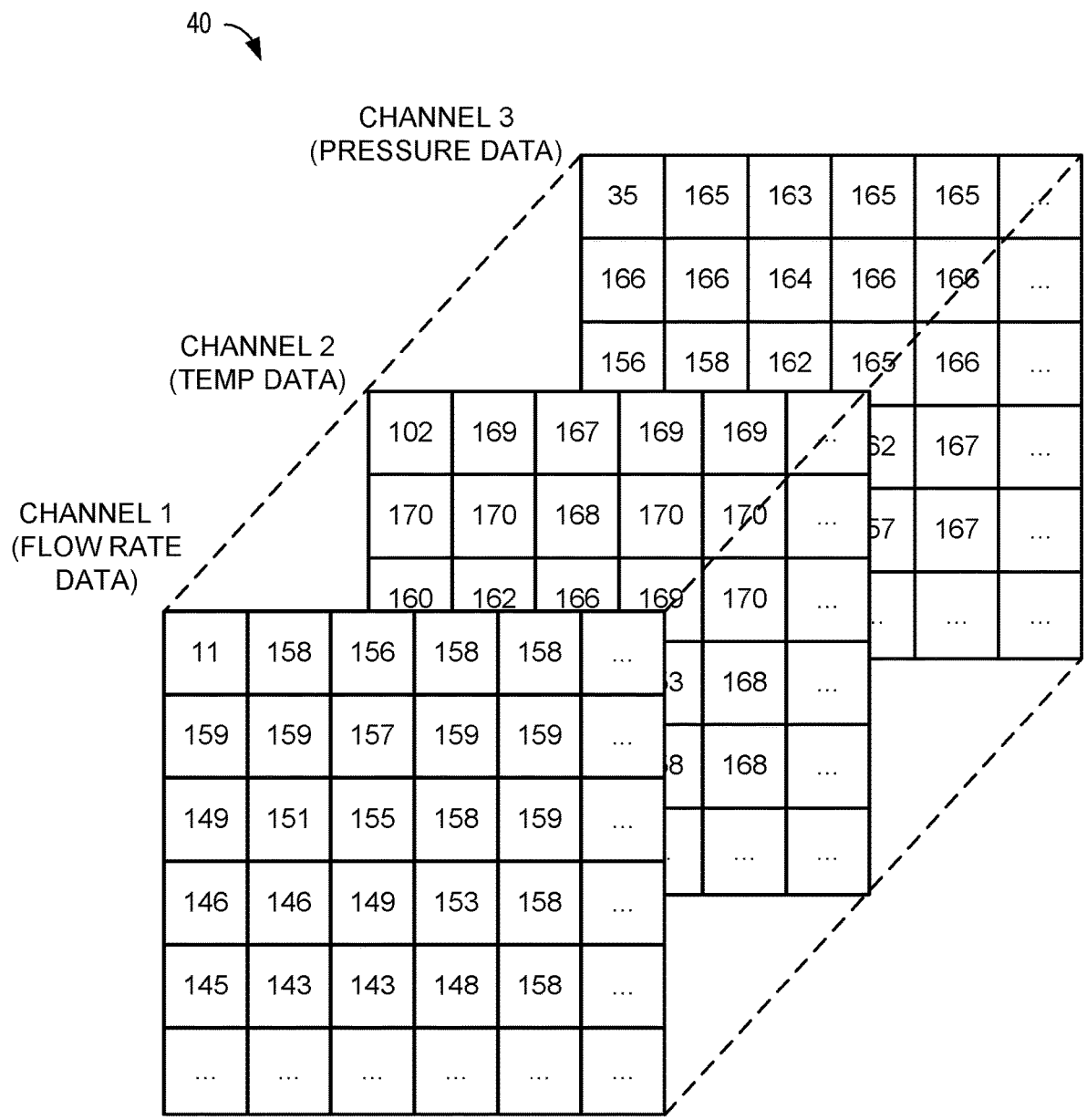
FIG. 4 shows an example of monitored gas delivery process data embodied as a three-dimensional array according to one example of the gas delivery system of FIG. 1.

Referring to FIG. 4, an example is depicted of the monitored gas delivery process data 40 converted into a three-dimensional array or an input image as an RGB image with three channels: red, green, and blue. It will be appreciated that the golden gas delivery process data 42 undergoes a similar conversion. The input images comprise pixels with a plurality of channels, each pixel corresponding to a time point. Each channel is dedicated to the sensor readings of one sensor or one valve. In other words, each channel corresponds to a separate sensor or valve. In this example, channel 1 is dedicated to flow rate sensor data, channel 2 is dedicated to temperature sensor data, and channel 3 is dedicated to pressure sensor data. Each pixel represents a data point at a particular point in time. Accordingly, each pixel may represent a row in the monitored gas delivery process data 40. Each pixel stores information about the intensity for each channel.

The intensity of each pixel at each channel may indicate a normalized sensor reading value or a normalized valve position value. In this example, the pixel at the top left corner of the image has an intensity of 11 at channel 1 encoding the flow rate sensor reading at 0 seconds, an intensity of 102 at channel 2 encoding the temperature sensor reading at 0 seconds, and an intensity of 35 at channel 3 encoding the pressure sensor reading at 0 seconds. Although three channels are represented in this image, it will be appreciated that the number of channels is not particularly limited, and additional channels may be added to the image as desired to accommodate the number of sensors that are monitored in the monitored gas delivery process data.

Figure 5A:
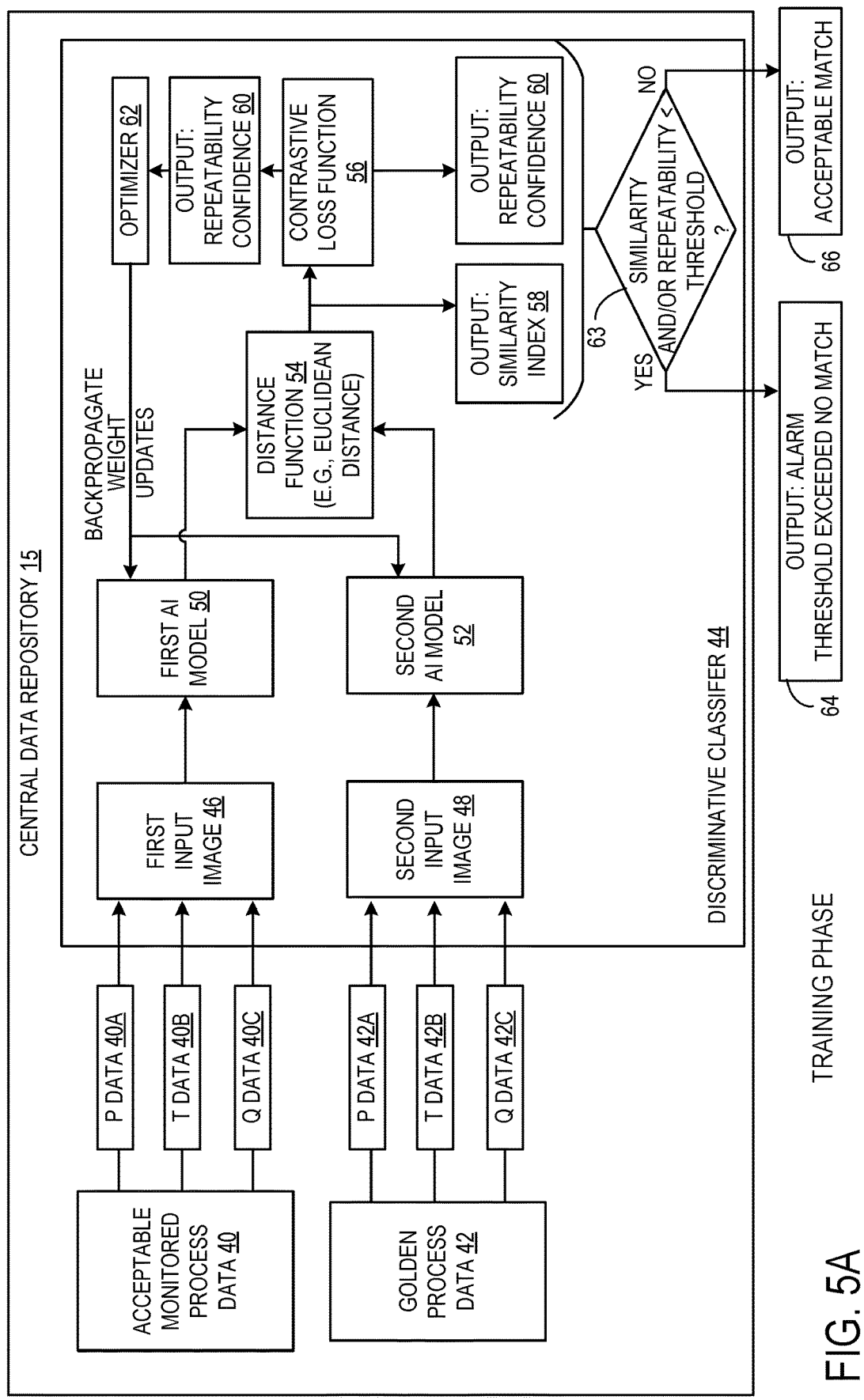
FIG. 5A shows a detailed schematic view of the central data repository, the monitored gas delivery process data, the golden gas delivery process data, and discriminative classifier according to one example of the gas delivery system of FIG. 1 in a training phase.

Referring to FIG. 5A, a detailed schematic view of the monitored gas delivery process data 40 and the golden gas delivery process data 42 are depicted. Two artificial intelligence models, a first artificial intelligence model 50 and a second artificial intelligence model 52, are provided as identical artificial intelligence models of function $G_w$ with the same weights. In other words, weights of the first artificial intelligence model 50 are equal to weights of the second artificial intelligence model 52. The first artificial intelligence model 50 and the second artificial intelligence model 52 can be configured as convolutional neural networks.

The non-volatile memory 14 stores instructions that, in response to execution by the processor 12A, cause the processor 12A to receive an acceptable monitored gas delivery process data 40 comprising sensor information and/or valve position information of a monitored gas delivery process; receive golden gas delivery process data 42 comprising sensor information and/or valve position information of a golden gas delivery process, and execute a discriminative classifier 44. In this schematic view, the discriminative classifier 44 is in a training phase of training the first artificial intelligence model 50 and the second artificial intelligence model 52.

The pressure sensor data 40A, the temperature sensor data 40B, and the flow rate sensor data 40C of the acceptable monitored gas delivery process data 40 are fed as a first input image 46 into the first artificial intelligence model 50 of the discriminative classifier 44 to extract features in the first input image 46 to obtain a first output $G(\vec{X}_1)$. The pressure sensor data 42A, the temperature sensor data 42B, and the flow rate sensor data 42C of the golden gas delivery process data 42 are fed as a second input image 48 into the second artificial intelligence model 52 of the discriminative classifier 44 to extract features in the second input image 48 to obtain a second output $G(\vec{X}_2)$.

The outputs $G(\vec{X}_1)$, $G(\vec{X}_2)$ of the first artificial intelligence model 50 and the second artificial intelligence model 52 are evaluated by the Euclidean distance function 54 to calculate, as a similarity value, the Euclidean distance $D_w(G_w(\vec{X}_1), G_w(\vec{X}_2))$ between the two outputs. Subsequently, the Euclidean distance function 54 outputs a similarity index 58 (see FIG. 6) indicating the similarity or the dissimilarity between the two outputs. The Euclidean distance is defined as:

$$\sqrt{\{G_W(X_1) - G_W(X_2)\}^2} \quad \text{[Formula 1]}$$

where $G_w$ is the function of one of the artificial intelligence models. $X_1$ and $X_2$ is the input data pair. Alternatively, other suitable distance functions may be used, such as Minkowski distance, Manhattan distance, cosine distance, etc.

Further, the output layers of the first artificial intelligence model 50 and the second artificial intelligence model 52 are fed into the contrastive loss function 56 to calculate, as a similarity value, the contrastive loss between the two images based on the calculated similarity index. The contrastive loss function is given as follows:

$$\frac{1}{2}(D_w)^2 \quad \text{[Formula 2]}$$

where $D_w$ is defined as the Euclidean distance between the outputs of the first and second artificial intelligence models 50, 52. Subsequently, the contrastive loss function 56 outputs a repeatability confidence value 60 based on the contrastive loss, indicating the level of confidence that the monitored gas delivery process is identical to the golden gas delivery process. For example, the repeatability confidence value 60 may be a value ranging from 0 to 1, with a value of 1 indicating a level of 100% confidence that the monitored gas delivery process is identical to the golden gas delivery process. The similarity index 58 and repeatability confidence value 60 are subsequently outputted to a graphical user interface of a display device. The discriminative classifier 44 includes a threshold evaluator 63 configured to determine whether the similarity index 58 and/or the repeatability confidence value 60 is below a predetermined threshold. When the discriminative classifier 44 determines that the similarity index 58 and/or the repeatability confidence value 60 is below the predetermined threshold, an alarm 64 is outputted indicating that the threshold has been exceeded, and the monitored gas delivery process does not match the golden gas delivery process. When the discriminative classifier 44 determines that the similarity index 58 and/or the repeatability confidence value 60 is not below the predetermined threshold, an indicator 66 is outputted stating that the monitored gas delivery process acceptably matches the golden gas delivery process.

During the training phase of the discriminative classifier 44, the gradients are calculated by back-propagation through the contrastive loss, the Euclidean distance, and the two instances of function $G_w$ via the outputted repeatability confidence value 60. The weights for the first artificial intelligence model 50 and the second artificial intelligence model 52 are updated using an optimizer 62 based on the calculated gradients. Accordingly, the accuracy of the discriminative classifier 44 is increased via the training process.

Although the above example discloses a first input image processed by a first artificial intelligence model and a second input image processed by a second artificial intelligence model, and outputs of the first and second artificial intelligence models evaluated by the Euclidean distance function to subsequently output a similarity index, it will be appreciated that, in other examples, as discussed below, the process data may alternatively be processed by a structural similarity evaluation module, which outputs a similarity index between the current process data and the golden process data based on similarities in structural features, which may include luminance and contrast (that is, gas delivery process data encoded as luminance and contrast in the pixel data for the images), for example. The output of the structural similarity evaluation module may then be processed by an artificial intelligence model to output a repeatability confidence value indicating the level of confidence that the monitored gas delivery process is identical (and optionally identical to within a threshold variance) to the golden gas delivery process.

Figure 5B:
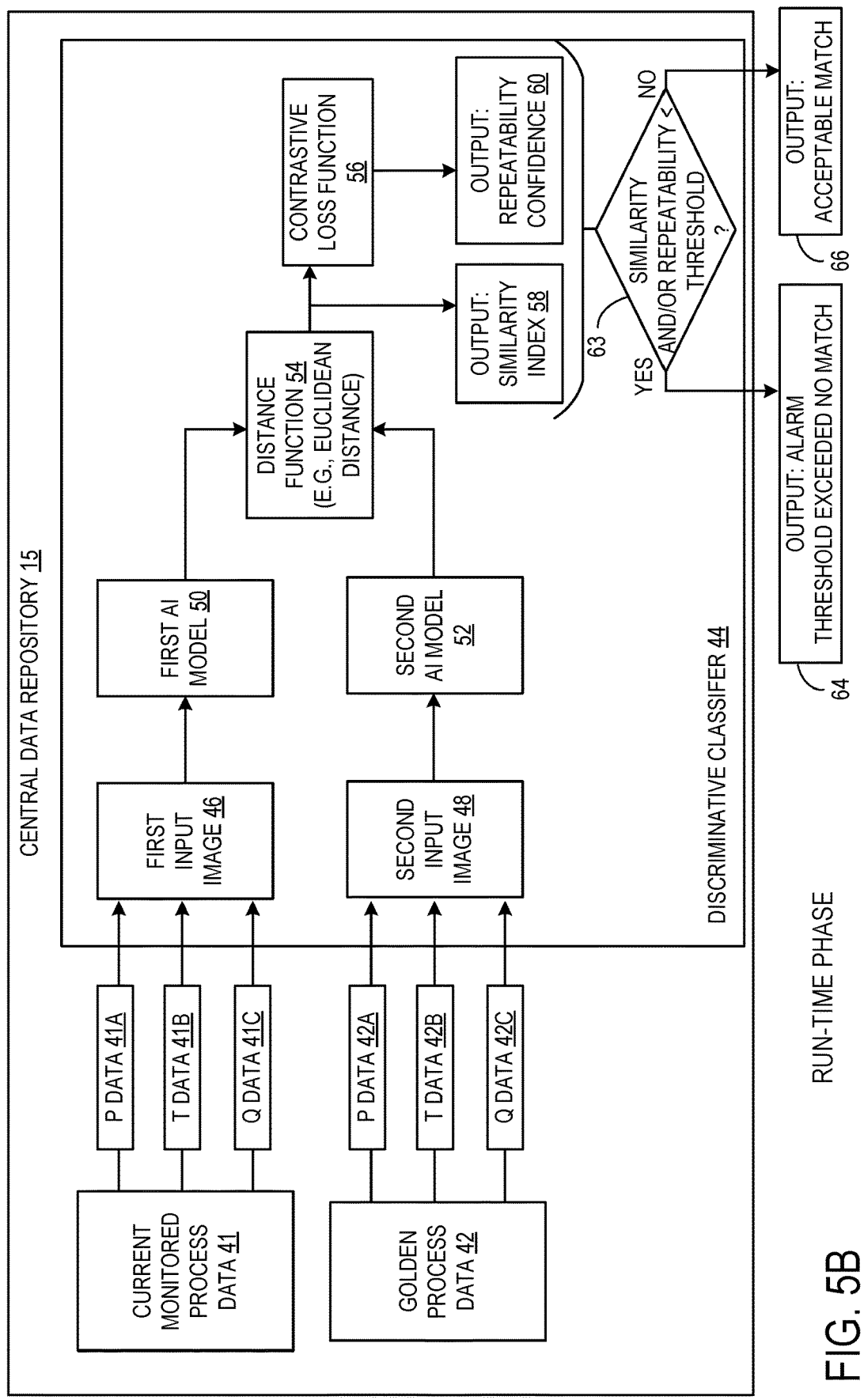
FIG. 5B shows a detailed schematic view of the central data repository, the monitored gas delivery process data, the golden gas delivery process data, and discriminative classifier according to one example of the gas delivery system of FIG. 1 in a run-time phase.

Referring to FIG. 5B, a detailed schematic view of a current monitored gas delivery process data 41, the golden gas delivery process data 42, and discriminative classifier 44 are depicted in a run-time phase. Typically, during the run-time phase the first and second artificial intelligence models are not trained, although real time feedback training based on the in-situ process results during manufacturing could be implemented. In the depicted example, instead of an acceptable monitored gas delivery process data 40 from a training data set, a current monitored gas delivery process data 41 from a manufacturing run, for example, is fed into the discriminative classifier 44. This may be performed in real time as the process occurs, or may be performed in batched jobs asynchronously. Since the example of FIG. 5B is substantially similar to the example of FIG. 5A with the exception of the omission of the acceptable monitored gas delivery process data 40, the optimizer 62, the calculation of the gradients by back-propagation, and the updating of the weights of the first artificial intelligence model 50 and the second artificial intelligence model 52 using the optimizer 62 based on the calculated gradients, the detailed description of the example of FIG. 5B is abbreviated here for the sake of brevity.

In FIG. 5B, the pressure sensor data 41A, the temperature sensor data 41B, and the flow rate sensor data 41C of the current monitored gas delivery process data 41 are fed as a first input image 46 into the first artificial intelligence model 50 of the discriminative classifier 44 to extract features in the first input image 46 to obtain a first output $G(\vec{X}_1)$. The pressure sensor data 42A, the temperature sensor data 42B, and the flow rate sensor data 42C of the golden gas delivery process data 42 are fed as a second input image 48 into the second artificial intelligence model 52 of the discriminative classifier 44 to extract features in the second input image 48 to obtain a second output $G(\vec{X}_2)$. When the discriminative classifier 44 determines that the similarity index 58 and/or the repeatability confidence value 60 is below the predetermined threshold, an alarm 64 is outputted indicating that the threshold has been exceeded, and the monitored gas delivery process does not match the golden gas delivery process. When the discriminative classifier 44 determines that the similarity index 58 and/or the repeatability confidence value 60 is not below the predetermined threshold, an indicator 66 is outputted stating that the monitored gas delivery process acceptably matches the golden gas delivery process.

Figure 5C:
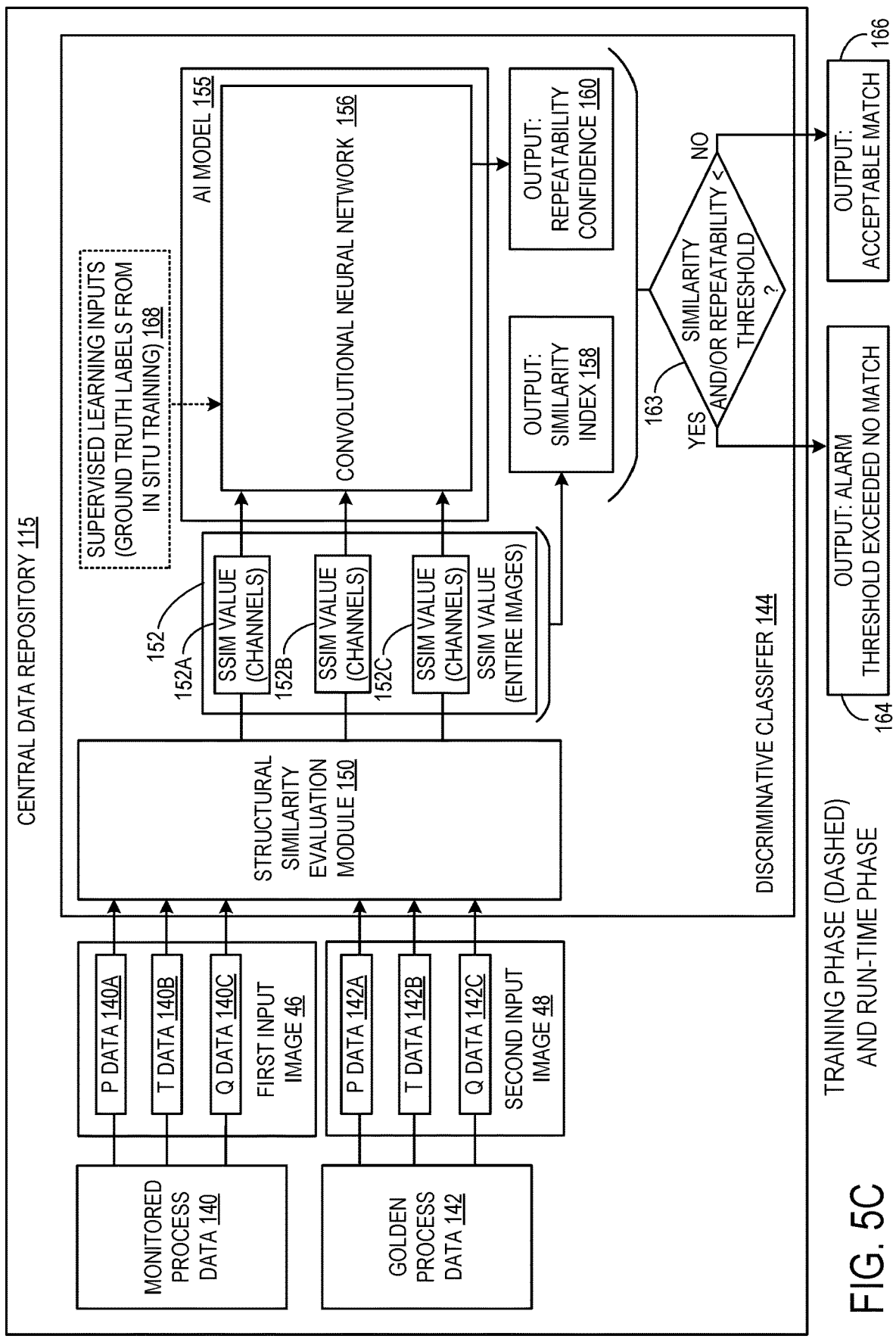
FIG. 5C shows a detailed schematic view of the central data repository, the monitored gas delivery process data, the golden gas delivery process data, and discriminative classifier according to another example of the gas delivery system of FIG. 1.

Referring to FIG. 5C, a detailed schematic view of the monitored gas delivery process data 140 and the golden gas delivery process data 142 are depicted as another example of the present disclosure. In this example, a structural similarity evaluation module 150 is provided instead of the first and second artificial intelligence models 50, 52 of the example of FIG. 5A. It will be appreciated that, in the examples of FIGS. 5A-C, the discriminative classifiers 44, 144 each include at least one artificial intelligence model in different configurations.

The central data repository 115 of the non-volatile memory 14 stores instructions that, in response to execution by the processor 12A, cause the processor 12A to receive a monitored gas delivery process data 140 comprising sensor information and/or valve position information of a monitored gas delivery process; receive golden gas delivery process data 142 comprising sensor information and/or valve position information of a golden gas delivery process, and execute a discriminative classifier 144.

The pressure sensor data 140A, the temperature sensor data 140B, and the flow rate sensor data 140C of the monitored gas delivery process data 140 are fed into the structural similarity evaluation module 150 of the discriminative classifier 144. The pressure sensor data 142A, the temperature sensor data 142B, and the flow rate sensor data 142C of the golden gas delivery process data 142 are also fed into the structural similarity evaluation module 150 of the discriminative classifier 144.

The structural similarity evaluation module 150 then compares the data from the monitored gas delivery process data 140 with the data from the golden gas delivery process data 142 to evaluate similarities in structural features, which may include luminance and contrast (that is, gas delivery process data encoded as luminance and contrast in the pixels of the images), for example. Thus, the structural similarity evaluation module 150 may be configured to receive the first and second input images 46, 48 including the channels containing the encoded pressure data 140A, 142A, temperature data 140B, 142B and flow rate data 140C, 142C, and compute a structural similarity index value (SSIM) 152 based on the comparison of the entire images. Then, a similarity index 158 may be computed, which may be the raw value for the SSIM 152 or maybe a normalized, scaled, or other value derived from the SSIM 152. The similarity index 158 indicates the similarity or the dissimilarity between the two images. After computation, the structural similarity evaluation module 150 outputs the similarity index 158 for use in downstream computations and/or for display.

Alternatively or additionally to computation of an SSIM value for a comparison of the entire first and second input images 46, 48, the structural similarity evaluation module 150 may compute and output channel-specific similarity indices for each sensor data set. In this example, the structural similarity evaluation module 150 outputs a first structural similarity index measure (SSIM) value 152A calculating a similarity value evaluating the similarity between the pressure sensor data 140A of the monitored gas delivery process data 140 and the pressure sensor data 142A of the golden gas delivery process data 142, a second SSIM value 152B as a similarity value evaluating the similarity between the temperature sensor data 140B of the monitored gas delivery process data 140 and the temperature sensor data 142B of the golden gas delivery process data 142, and a third SSIM value 152C as a similarity value evaluating the similarity between the flow rate sensor data 140C of the monitored gas delivery process data 140 and the flow rate sensor data 142C of the golden gas delivery process data 142.

Further, the SSIM value 152, and additionally or alternatively the first SSIM value 152A, the second SSIM value 152B, and the third SSIM value 152C, are fed into a convolutional neural network 156 of an artificial intelligence model 155 to calculate, as a similarity value, a repeatability confidence value between the two sets of data based on the calculated similarity indices 152A-C. Subsequently, the artificial intelligence model 155 outputs a repeatability confidence value 160 based on the first SSIM value 152A, the second SSIM value 152B, and the third SSIM value 152C, indicating the level of confidence that the monitored gas delivery process is identical to the golden gas delivery process. For example, the repeatability confidence value 160 may be a value ranging from 0 to 1, with a value of 1 indicating a level of 100% confidence that the monitored gas delivery process is identical to the golden gas delivery process (or optionally, identical to within a threshold variance). The convolutional neural network 156 may be trained via supervised learning inputs 168, which may include ground truth labels from in-situ training. The similarity index 158 and repeatability confidence value 160 are subsequently outputted to a graphical user interface of a display device, as described in reference to FIG. 9.

The discriminative classifier 144 includes a threshold evaluator 163 configured to determine whether the similarity index 158 and/or the repeatability confidence value 160 is below a predetermined threshold. When the discriminative classifier 144 determines that the similarity index 158 and/or the repeatability confidence value 160 is below the predetermined threshold, an alarm 164 is outputted indicating that the threshold has been exceeded, and the monitored gas delivery process does not match the golden gas delivery process. When the discriminative classifier 144 determines that the similarity index 158 and/or the repeatability confidence value 160 is not below the predetermined threshold, an indicator 166 is outputted stating that the monitored gas delivery process acceptably matches the golden gas delivery process.

Referring to FIG. 6, an example of the similarity index 58 outputted by the Euclidean distance function 54 is illustrated, where the similarity index is 1 at the beginning of the process (at time segments 1 through 11) when the monitored process has not yet deviated from the golden gas delivery process, and the similarity index is less than 1 at the end of the process (at time segments 81 through 91) when the monitored process has had time to deviate significantly from the golden gas delivery process. In this example, the similarity indices are consistently less than 1 for the monitored gas delivery process (see bottom table), indicating some dissimilarity in the monitored gas delivery process from the golden gas delivery process. The top table shows hypothetical baseline similarity index results if the monitored gas delivery process were to be a complete match with the golden gas delivery process, with all similarity indices indicating values of 1.

Figure 7A:
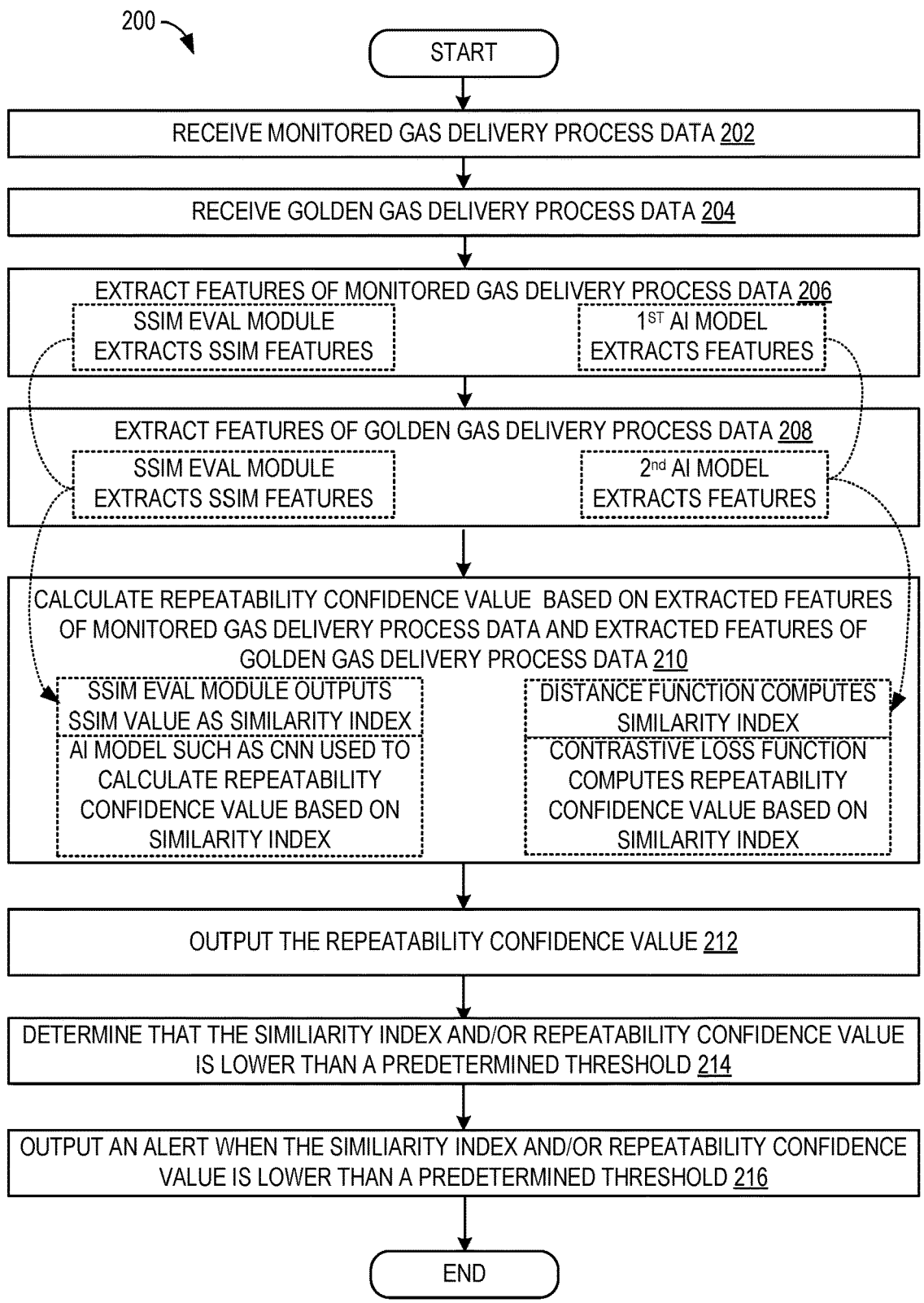
FIG. 7A shows a first method for outputting an alarm when a similarity index and/or repeatability confidence value for a monitored gas delivery process of a gas delivery system is lower than a predetermined threshold according to one example of the gas delivery system of FIG. 1.

FIG. 7A illustrates a flow chart of an example configuration of a first method 200 according to one aspect of the subject disclosure. The following description of the first method 200 is provided with reference to the software and hardware components described above and shown in FIGS. 1, 2, and 5B. This flow chart of the first method 200 illustrates the run-time phase of a process for outputting an alarm when a similarity index and/or repeatability confidence value for a monitored gas delivery process of a gas delivery system is lower than a predetermined threshold.

At step 202, monitored gas delivery process data is received. At step 204, golden gas delivery process data is received. At step 206, features of the monitored gas delivery process data are extracted. The extraction of features of the monitored gas delivery process may be performed by a first artificial intelligence model or a structural similarity evaluation module. At step 208, features of the golden gas delivery process data are extracted. The extraction of features of the golden gas delivery process may be performed by a second artificial intelligence model or the structural similarity evaluation module.

At step 210, a repeatability confidence value is calculated based on the extracted features of the monitored gas delivery process data and the extracted features of the golden gas delivery process data. The calculation of the repeatability confidence value may be performed by an artificial intelligence model, a convolutional neural network for example, based on a similarity index calculated by the structural similarity evaluation module. Alternatively, the calculation of the repeatability confidence value may be performed via a contrastive loss function based on a similarity index calculated by a distance function. At step 212, the repeatability confidence value is outputted. At step 214, it is determined that the similarity index and/or repeatability confidence value is lower than a predetermined threshold. At step 216, responsive to determining that the similarity index and/or repeatability confidence value is lower than the predetermined threshold, an alarm is outputted.

Figure 7B:
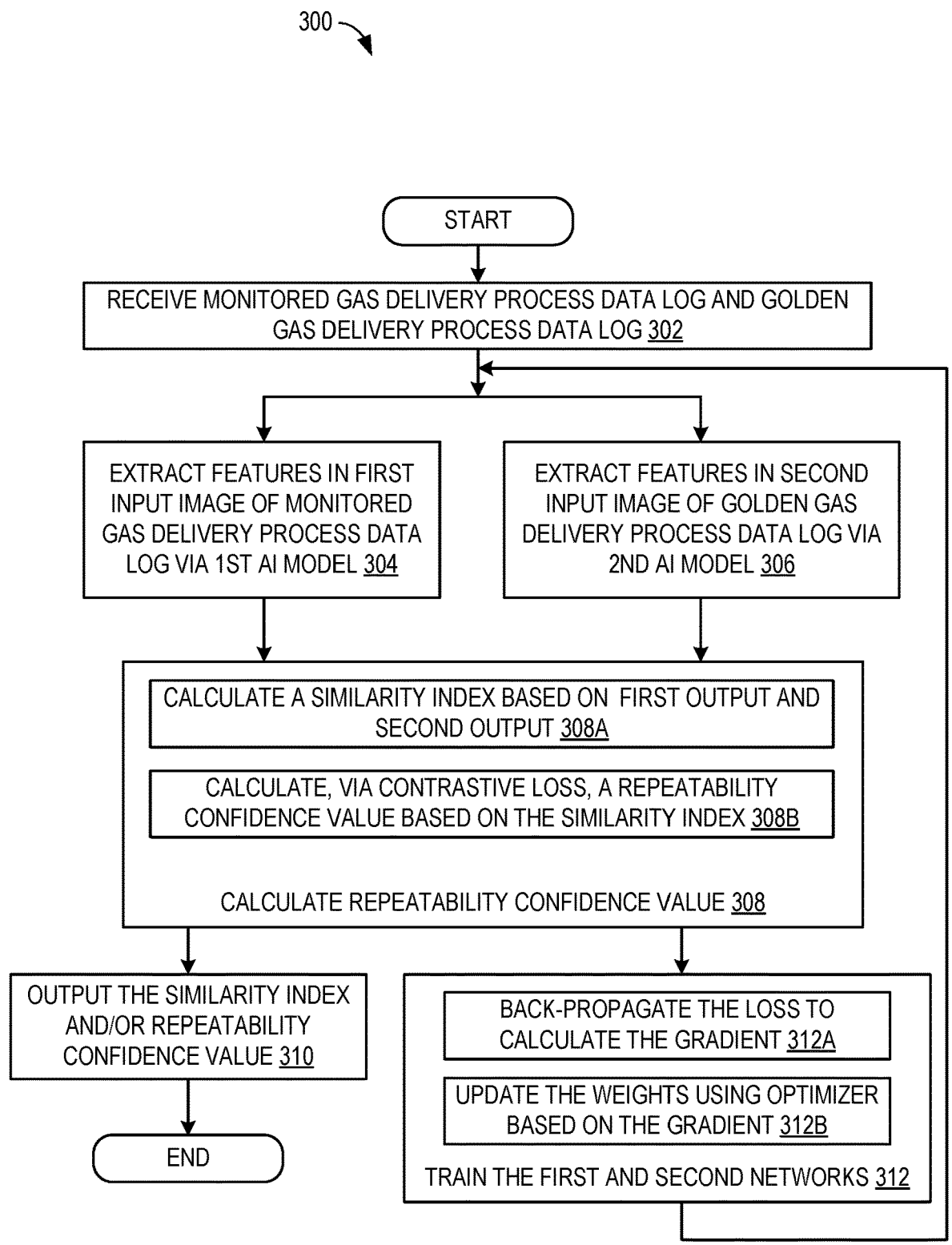
FIG. 7B shows a second method for outputting a similarity index and repeatability confidence value for a monitored gas delivery process of a gas delivery system and training artificial intelligence models according to one example of the gas delivery system of FIG. 1.

FIG. 7B illustrates a flow chart of an example configuration of a second method 300 according to one aspect of the subject disclosure. The following description of the second method 300 is provided with reference to the software and hardware components described above and shown in FIGS. 1, 2, and 5A. This flow chart of the second method 300 illustrates the training phase of a process for outputting an alarm when a similarity index and/or repeatability confidence value for a monitored gas delivery process of a gas delivery system is lower than a predetermined threshold.

At step 302, data of the monitored gas delivery process of the gas delivery system is received as a first input image, and data of the golden gas delivery process of the gas delivery system is received as a second input image. At step 304, features in the first input image of the monitored gas delivery process data are extracted via the first artificial intelligence model of function $G_w$ to obtain a first output $G(\vec{X}_1)$. At step 306, features in the second input image of the golden gas delivery process data are extracted via the second artificial intelligence model of function $G_w$ to obtain a second output $G(\vec{X}_2)$. At step 308, a repeatability confidence value is calculated based on a similarity index, in which at step 308A, a similarity index is calculated via Euclidean distance $D_w(G_w(\vec{X}_1), G_w(\vec{X}_2))$ based on the first output and the second output, and at step 308B, a repeatability confidence value is calculated via contrastive loss $L=\frac{1}{2}(D_w)^2$ based on the calculated similarity index for the first output $G(\vec{X}_1)$ and the second output $G(\vec{X}_2)$. At step 310, the repeatability confidence value is outputted to a graphical user interface of a display device. At step 312, the first artificial intelligence model and the second artificial intelligence model are trained, in which at step 312A, the gradients are computed by back-propagation through the contrastive loss, the Euclidean distance, and the two instances of function $G_w$, and at step 312B, the weights of the first artificial intelligence model and the second artificial intelligence model are updated using an optimizer based on the calculated gradients. During the training phase, the first method 300 returns to steps 304 and 306 to resume extracting features of the input images.

Figure 7C:
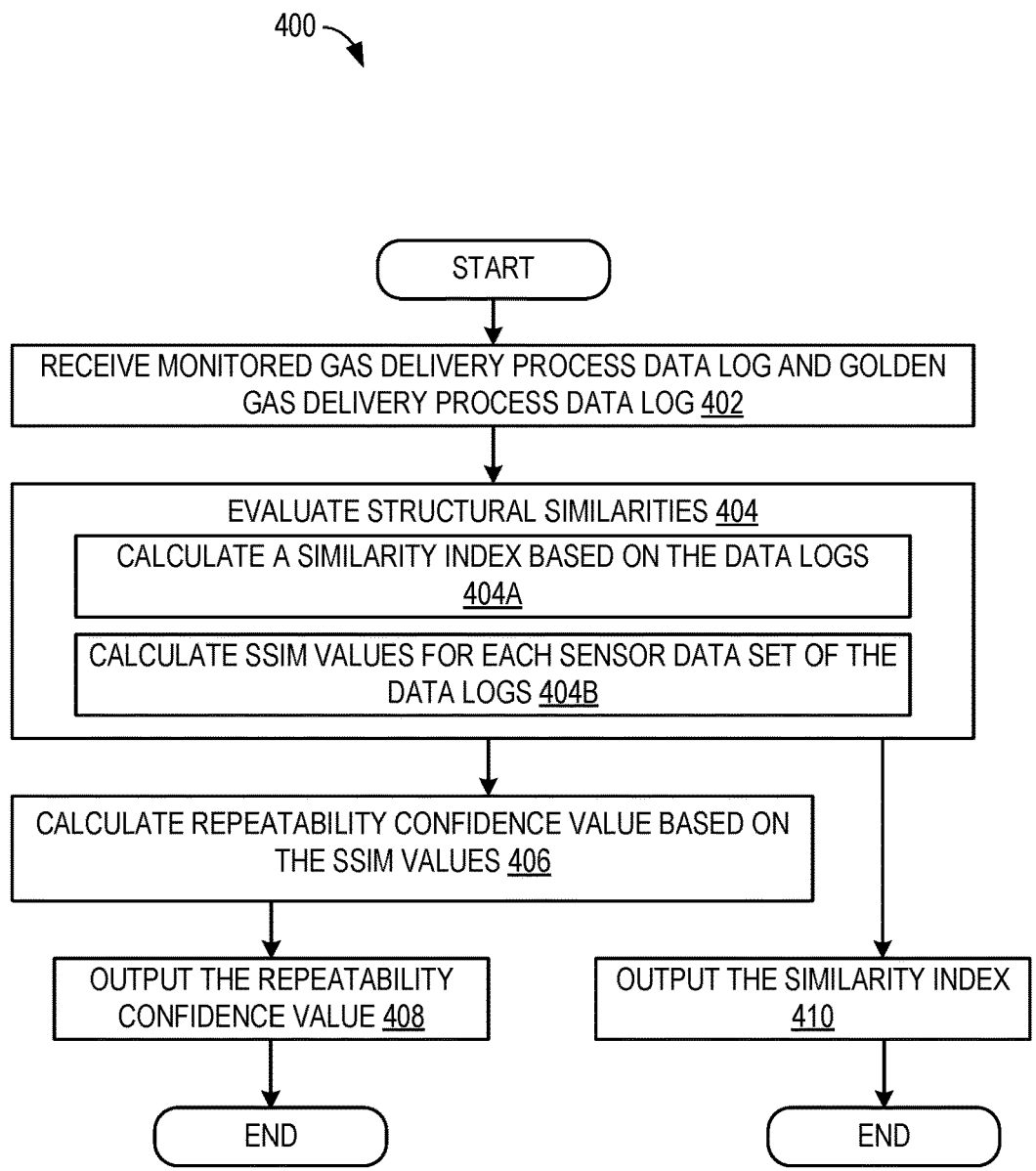
FIG. 7C shows a third method for outputting a similarity index and/pr repeatability confidence value for a monitored gas delivery process of a gas delivery system according to another example of the gas delivery system of FIG. 1.

FIG. 7C illustrates a flow chart of an example configuration of a second method 400 according to one aspect of the subject disclosure. The following description of the second method 400 is provided with reference to the software and hardware components described above and shown in FIGS. 1, 2, and 5C.

At step 402, data of the monitored gas delivery process of the gas delivery system and data of the golden gas delivery process of the gas delivery system are received by the structural similarity evaluation module. At step 404, similarities in structural features are evaluated between the monitored gas delivery process data and the golden gas delivery process data, in which at step 404A, a similarity index is calculated based on the two sets of data, and at step 404B, SSIM values are calculated for each sensor data set of the data sets. At step 406, a repeatability confidence value is calculated based on the SSIM values via an artificial intelligence model. At step 408, the repeatability confidence value is outputted to a graphical user interface of a display device. At step 410, the similarity index is outputted to a graphical user interface of a display device.

In accordance with the present disclosure, an integrated, real-time central control may process all sensor data in one location, control the entire gas delivery, and log all data into the central data repository in real time. In addition, with all real-time sensor data stored in one location, sophisticated performance analysis can be done with machine learning and in-process real-time adjustments of flow parameters to improve performance and repeatability in the gas delivery system. Using a discriminative classifier, the monitored gas delivery process of the gas delivery system can be compared with a golden gas delivery process in real-time, and deviations of the monitored gas delivery process from the golden gas delivery process can be immediately detected in real-time, so that the monitored gas delivery process can be effectively monitored for subtle changes from normal parameters.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
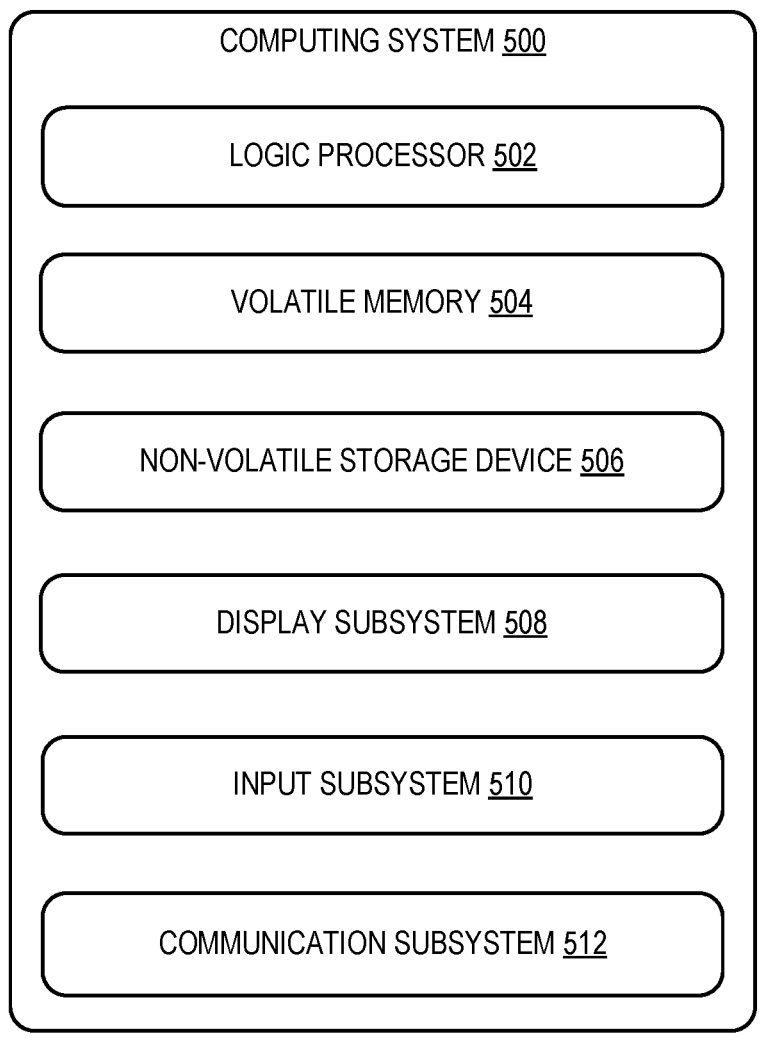
FIG. 8 shows a schematic view of an example computing environment in which the methods used with the gas delivery system of FIGS. 1 and 2 may be enacted.

FIG. 8 schematically shows a non-limiting embodiment of a computing system 500 that can enact one or more of the processes described above. Computing system 500 is shown in simplified form. Computing system 500 may embody the controller module 12 or controlled modules 20, 24A-D, 26A-D, 30A-P described above and illustrated in FIGS. 1 and 2. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 8.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

Figure 9:
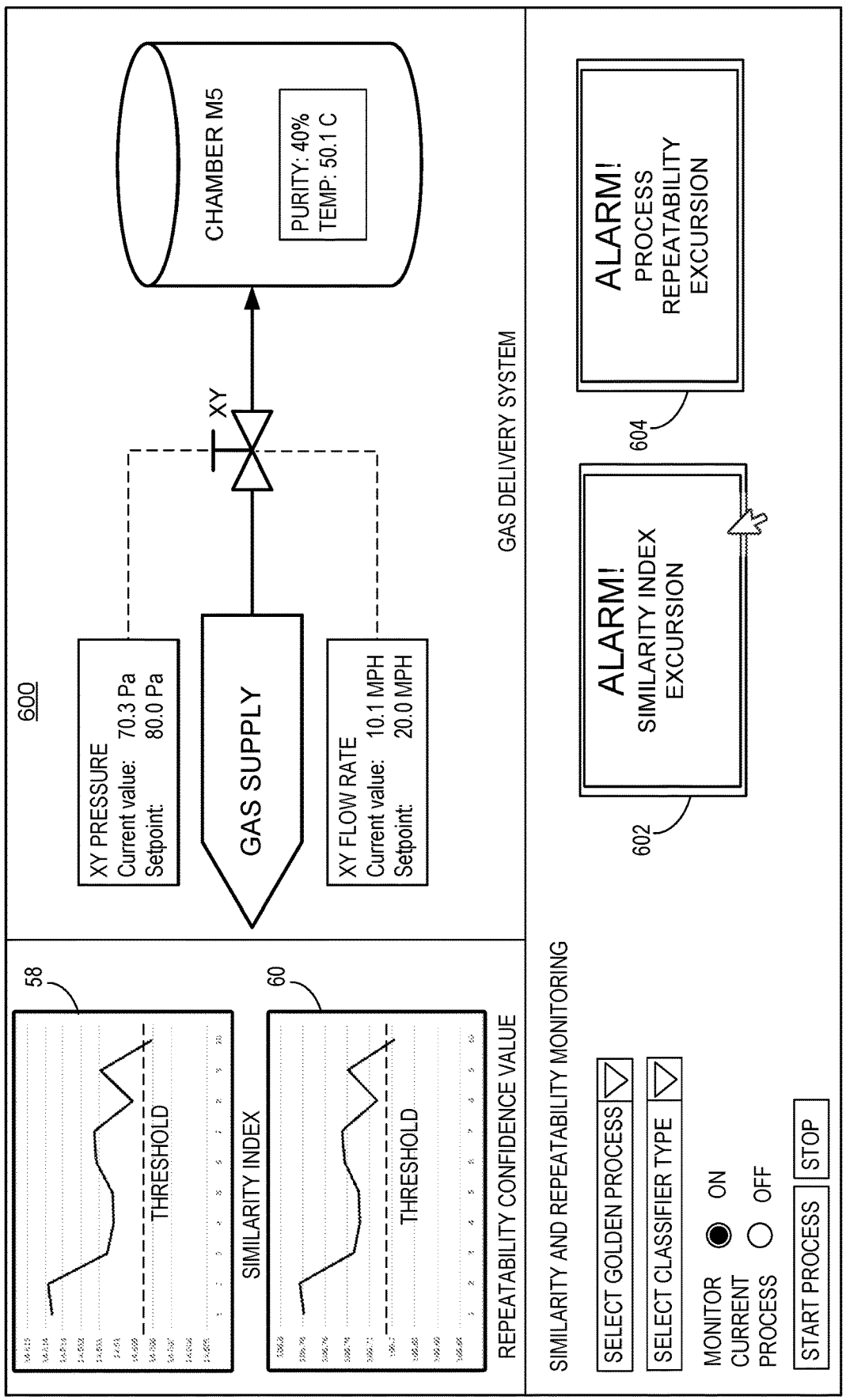
FIG. 9 shows an exemplary graphical user interface of the gas delivery system of FIG. 1, indicating alarms for notifying a user of repeatability deviations or excursions of the monitored gas delivery process from the golden gas delivery process.

Referring to FIG. 9, a GUI 600 is shown according to one example of the present disclosure. In this example, a user is notified of any repeatability deviations or excursions of the monitored gas delivery process from the golden gas delivery process via alarms 602, 604 that are indicated on the GUI 600 displayed on the display subsystem 508. The GUI 600 may be displayed on a display device that is dedicated to a gas delivery system 10, or displayed on a display device of a distributed control system (DCS) serving multiple gas delivery systems as in this example. In this example, the gas delivery system is simply a gas supply flowing gas into a chamber M5. A pressure sensor and a flow sensor are provided on a valve XY which regulates the flow of gas from the gas supply into the chamber M5. On the GUI 600, the user may see a similarity index 58 and/or repeatability confidence value 60 for the gas delivery process in a graphical form as line charts, so that the user may visually assess changes in the similarity index 58 and/or repeatability confidence value 60 over time. The user may operate a SELECT GOLDEN PROCESS button to access options for setting a golden gas delivery process, against which the current gas delivery process is compared, and setting a predetermined threshold which, when crossed by the similarity index 58 or the repeatability confidence value 60, causes the system controller 12 to send a first alarm 602 and/or second alarm 604 indicating that an excursion or deviation has been detected. In this example, excursions have been detected for the similarity index 58 and the repeatability confidence value 60 which have crossed predetermined thresholds, so that a warning box indicating "ALARM! SIMILARITY INDEX EXCURSION" is displayed on the GUI 600 as a first alarm 602, and a warning box indicating "ALARM! PROCESS REPEATABILITY EXCURSION" is displayed on the GUI 600 as a second alarm 604. The user may operate a SELECT CLASSIFIER TYPE button to select between a discriminative classifier using artificial intelligence models and a discriminative classifier using a structural similarity evaluation module that does not incorporate artificial intelligence models.

It will be appreciated that the predetermined threshold may be a plurality of predetermined thresholds or limits. For example, a plurality of alarm levels may be provided: a LO level alarm may be activated for an excursion below a first lower threshold, and a LO-LO level alarm may be activated for an excursion below a second lower threshold lower than a first lower threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A computing system, comprising:
a processor and a non-volatile memory storing executable instructions that, in response to execution by the processor, cause the processor to:
receive monitored gas delivery process data comprising sensor information and/or valve position information of the monitored gas delivery process;
receive golden gas delivery process data comprising sensor information and/or valve position information of the golden gas delivery process; and
execute a discriminative classifier including at least one artificial intelligence model, the discriminative classifier being configured to:
extract features of the monitored gas delivery process data;
extract features of the golden gas delivery process data;
calculate a similarity value for the monitored gas delivery process based on the extracted features of the monitored gas delivery process data and the extracted features of the golden gas delivery process data; and
output the similarity value.

2. The computing system of claim 1,
wherein the similarity value is a structural similarity value;
wherein the extracted features of the monitored gas delivery process data are structural similarity features;
wherein the extracted features of the golden gas delivery process data are structural similarity features;
wherein the discriminative classifier further includes a structural similarity evaluation module configured to extract the structural similarity features of the monitored gas delivery process data and to extract the structural similarity features of the golden gas delivery process data and to output the structural similarity value based thereon; and
wherein the at least one artificial intelligence model is a convolutional neural network configured to receive as input the structural similarity value and calculate a repeatability confidence value.

3. The computing system of claim 1, wherein the at least one artificial intelligence model is a first artificial intelligence model configured to extract the features of the monitored gas delivery process data from a first input image, the discriminative classifier further including:
a second artificial intelligence model configured to extract the features of the golden gas delivery process data from a second input image;
a Euclidean distance function module configured to apply a Euclidean distance function to calculate a similarity index between the first input image and the second input image based on outputs of the first artificial intelligence model and the second artificial intelligence model, and
a contrastive loss function module configured compute a repeatability confidence value based on the similarity index by applying a contrastive loss function; and
wherein the similarity value is at least one of the similarity index and the repeatability confidence value.

4. The computing system of claim 3, wherein
the first input image and the second input image each comprise pixels with a plurality of channels, each pixel corresponding to a time point.

5. The computing system of claim 4, wherein
each channel corresponds to a separate sensor or valve;
an intensity of each pixel at each channel indicates a normalized sensor reading value or a normalized valve position value.

6. The computing system of claim 3, further comprising:
an optimizer configured to update weights of the first artificial intelligence model and the second artificial intelligence model.

7. The computing system of claim 3, wherein
the first artificial intelligence model and the second artificial intelligence model are convolutional neural networks; and
weights of the first artificial intelligence model are equal to weights of the second artificial intelligence model.

8. The computing system of claim 3, wherein the discriminative classifier is further configured to:
determine that the repeatability confidence value or the similarity index used to compute the repeatability confidence value exceeds a predetermined threshold; and
output an alarm when the repeatability confidence value or the similarity index is determined to exceed the predetermined threshold.

9. A computing method, comprising:
receiving monitored gas delivery process data comprising sensor information and/or valve position information of the monitored gas delivery process;
receiving golden gas delivery process data comprising sensor information and/or valve position information of the golden gas delivery process;
execute a discriminative classifier including at least one artificial intelligence model, the discriminative classifier being configured to:
extract features of the monitored gas delivery process data;
extract features of the golden gas delivery process data;
calculate a similarity value for the monitored gas delivery process based on the extracted features of the monitored gas delivery process data and the extracted features of the golden gas delivery process data; and
output the similarity value.

10. The computing method of claim 9,
wherein the similarity value is a structural similarity value;
wherein the extracted features of the monitored gas delivery process data are structural similarity features;

wherein the extracted features of the golden gas delivery process data are structural similarity features;
wherein the discriminative classifier further includes a structural similarity evaluation module configured to extract the structural similarity features from the monitored gas delivery process data and to extract the structural similarity features of the golden gas delivery process data and to output the structural similarity value based thereon; and
wherein the at least one artificial intelligence model is a convolutional neural network configured to receive as input the structural similarity value and calculate a repeatability confidence value.

11. The computing method of claim 9,
wherein the at least one artificial intelligence model is a first artificial intelligence model configured to extract the features of the monitored gas delivery process data from a first input image, the discriminative classifier further including a second artificial intelligence model configured to extract the features of the golden gas delivery process data from a second input image;
wherein calculating the similarity value includes:
applying a Euclidean distance function to calculate a similarity index between the first input image and the second input image based on outputs of the first artificial intelligence model and the second artificial intelligence model, and
computing a repeatability confidence value based on the similarity index by applying a contrastive loss function; and
wherein the similarity value is at least one of the similarity index and the repeatability confidence value.

12. The computing method of claim 11, wherein
the first input image and the second input image comprise pixels with a plurality of channels, each pixel corresponding to a time point;
each channel corresponds to a separate sensor or valve; and
an intensity of each pixel at each channel indicates a normalized sensor reading value or a normalized valve position value.

13. The computing method of claim 11, further comprising:
updating weights of the first artificial intelligence model and the second artificial intelligence model,
wherein weights of the first artificial intelligence model are equal to weights of the second artificial intelligence model.

14. The computing method of claim 9, further comprising:
determining that a repeatability confidence value or a similarity index used to compute the repeatability confidence value exceeds a predetermined threshold; and
outputting an alarm based when the repeatability confidence value or the similarity index is determined to exceed the predetermined threshold,
wherein the similarity value is at least one of the similarity index and the repeatability confidence value.

15. A gas delivery apparatus, comprising:
a plurality of valves and sensors;
a processor operatively coupled to the plurality of valves and sensors; and
non-volatile memory operatively coupled to the processor and storing monitored gas delivery process data, a golden gas delivery process data, and a discriminative classifier, wherein
the non-volatile memory stores executable instructions that, in response to execution by the processor, cause the processor to:
receive the monitored gas delivery process data comprising sensor information and/or valve position information of the monitored gas delivery process;
receive the golden gas delivery process data comprising sensor information and/or valve position information of the golden gas delivery process; and
execute the discriminative classifier including at least one artificial intelligence model, the discriminative classifier being configured to:
extract features of the monitored gas delivery process data;
extract features of the golden gas delivery process data;
calculate a similarity value for the monitored gas delivery process based on the extracted features of the monitored gas delivery process data and the extracted features of the golden gas delivery process data; and
output the similarity value.

16. The gas delivery apparatus of claim 15,
wherein the similarity value is a structural similarity value;
wherein the extracted features of the monitored gas delivery process data are structural similarity features;
wherein the extracted features of the golden gas delivery process data are structural similarity features;
wherein the discriminative classifier further includes a structural similarity evaluation module configured to extract the structural similarity features from the monitored gas delivery process data and to extract the structural similarity features of the golden gas delivery process data and to output the structural similarity value based thereon; and
wherein the at least one artificial intelligence model is a convolutional neural network configured to receive as input the structural similarity value and calculate a repeatability confidence value.

17. The gas delivery apparatus of claim 15, wherein the at least one artificial intelligence model is a first artificial intelligence model configured to extract the features of the monitored gas delivery process data from a first input image, the discriminative classifier further including:
a second artificial intelligence model configured to extract the features of the golden gas delivery process data from a second input image, wherein weights of the first artificial intelligence model are equal to weights of the second artificial intelligence model;
a Euclidean distance function module configured to apply a Euclidean distance function to calculate a similarity index between the first input image and the second input image based on outputs of the first artificial intelligence model and the second artificial intelligence model, and
a contrastive loss function module configured compute a repeatability confidence value based on the similarity index by applying a contrastive loss function; and
wherein the similarity value is at least one of the similarity index and the repeatability confidence value.

18. The gas delivery apparatus of claim 17, wherein
the first input image and the second input image comprise pixels with a plurality of channels, each pixel corresponding to a time point;
each channel corresponds to a separate sensor or valve; and an intensity of each pixel at each channel indicates a normalized sensor reading value or a normalized valve position value.

19. The gas delivery apparatus of claim 17, wherein the first artificial intelligence model and the second artificial intelligence model are convolutional neural networks; and weights of the first artificial intelligence model are equal to weights of the second artificial intelligence model.

20. The gas delivery apparatus of claim 15, wherein the processor is further configured to:

determine that a repeatability confidence value or a similarity index used to compute the repeatability confidence value exceeds a predetermined threshold; and output an alarm based when the repeatability confidence value or the similarity index is determined to exceed the predetermined threshold, and the similarity value is at least one of the similarity index and the repeatability confidence value.

* * * * *